Aug. 24, 1948.　　　　J. C. McCUNE　　　　2,447,709
DECELERATION CONTROL APPARATUS

Filed April 30, 1943　　　　4 Sheets-Sheet 1

Fig.1

INVENTOR
Joseph C. McCune
BY
ATTORNEY

Aug. 24, 1948.  J. C. McCUNE  2,447,709
DECELERATION CONTROL APPARATUS
Filed April 30, 1943  4 Sheets-Sheet 2

INVENTOR
Joseph C. McCune
BY
ATTORNEY

Aug. 24, 1948.  J. C. McCUNE  2,447,709
DECELERATION CONTROL APPARATUS
Filed April 30, 1943  4 Sheets-Sheet 3

INVENTOR
Joseph C. McCune
BY
ATTORNEY

Fig. 7.

Patented Aug. 24, 1948

2,447,709

UNITED STATES PATENT OFFICE 2,447,709

DECELERATION-CONTROL APPARATUS

Joseph C. McCune, Edgewood, Pa., assignor to The Westinghouse Air Brake Company, Wilmerding, Pa., a corporation of Pennsylvania Application April 30, 1943, Serial No. 485,130

8 Claims. (Cl. 264—1)

This invention relates to deceleration control apparatus for vehicles, such as railway cars and trains, and has particular relation to apparatus for detecting the slipping condition of vehicle wheels and adapted to control the brakes associated with the vehicle wheels in a manner to prevent sliding thereof.

Sliding of the wheels of railway cars and trains due to excessive braking effort exerted on the wheels in relation to the adhesion between the wheels and the rails is a problem for which an adequate and yet simple solution has long been sought. The term "sliding" as applied herein to vehicle wheels refers to the dragging of a vehicle wheel along a rail or road surface in locked or non-rotative condition. Sliding of railway car wheels causes flat spots to be developed on the wheels necessitating repair or replacement of the wheels and is therefore objectionable because of the expense and delay involved. Moreover, the retardation exerted on a railway car by a sliding wheel is much less than that of a freely rolling wheel and sliding of a wheel is thus a dangerous condition from a safety standpoint.

Within the last few years, various devices have been proposed and applied to railway cars and trains for the purpose of detecting the slipping condition of a car wheel and operative in response to the slipping condition to effect a rapid reduction in the degree of application of the brakes, independently of the operator's control of the brakes, so as to cause a slipping wheel to be restored to a speed corresponding to car speed without decelerating to a locked or sliding condition.

The term "slipping" or "slipping condition" as employed herein in connection with vehicle wheels refers to the rotation of a vehicle wheel at a speed different from that corresponding to vehicle speed at a given instant and may be caused either by excessive propulsion torque or excessive braking torque applied to a wheel. In the case of excessive propulsion torque, the vehicle wheel rotates at a speed faster than that corresponding to vehicle speed at a given instant; whereas, in the case of excessive braking torque, the vehicle wheel rotates at a speed less than that corresponding to vehicle speed at a given instant.

When a vehicle wheel begins to slip due to excessive braking torque, it decelerates at an abnormally rapid rate from a speed corresponding to vehicle speed toward zero speed corresponding to a locked condition. It has been determined that ordinarily under the most favorable adhesion conditions between a railway car wheel and the rail on which it rolls, the wheel cannot greatly exceed a rate of deceleration corresponding to retardation of the car at five miles per hour per second without slipping. If, therefore, a railway car wheel decelerates at a rate exceeding a certain rate corresponding to retardation of the car at ten miles per hour per second, it is a positive indication that the wheel is slipping.

The various devices heretofore proposed for recognizing the slipping condition of a vehicle wheel due to excessive braking, or for that matter due to excessive propulsion torque, have been based on this fundamental principle that rotative deceleration or acceleration of a vehicle wheel at a rate exceeding a certain predetermined rate is indicative of the slipping condition.

The devices heretofore proposed for recognizing or detecting a wheel slip condition have been both electrical and mechanical in nature. One of the mechanical types of devices heretofore proposed for detecting the slipping condition of a vehicle wheel has been of the so-called rotary inertia or fly-wheel type. In this type of device, a fly-wheel is rotatively driven according to the speed of rotation of a vehicle wheel or wheel unit through a resilient connection which permits a limited amount of leading or lagging movement of the fly-wheel rotatively with respect to its driving wheel unit in response to deceleration and acceleration of the wheel unit respectively, the amount of leading or lagging movement of the fly-wheel relative to the driving wheel unit being substantially directly proportional to the rate of deceleration or acceleration of the wheel unit. By means of suitable switch devices responsive to a predetermined leading or lagging movement of the fly-wheel rotatively relative to its wheel unit and corresponding to a predetermined rate of deceleration or acceleration suitable control of the brakes or of the propulsion means has been provided whereby to cause termination of the slipping condition. In the case of slipping of the wheels due to excessive braking effort, such devices operate so rapidly as to cause a slipping wheel to be restored to a speed corresponding to vehicle or car speed before the slipping wheel decelerates to a locked condition and slides.

It has been proposed, heretofore, to associate a wheel-slip detecting device of the rotary inertia type directly with a railway car wheel and axle unit, such as by mounting the device in the axle journal casing and driving it by direct connection with the end of the axle. Patent No. 2,198,033 to Clyde C. Farmer discloses such an arrangement.

It has been found, however, that due to the road shock transmitted to the device when carried in direct association with the wheel and axle unit of a railway car, the life of such devices is excessively short. In other words, the excessive road shock results in hammering or breaking of parts and consequently interferes with the proper sensitivity or operation of the device.

It is accordingly an object of my invention to provide novel apparatus which may be associated directly with a wheel unit of a railway car for the purpose of detecting the deceleration or acceleration thereof which can withstand the road shock to which it is subjected and which has a relatively long service life obviating the necessity for frequent servicing or repair.

It is another object of my present invention to provide wheel slip detecting apparatus of the rotary inertia or fly-wheel type and characterized by a novel construction which minimizes the effect of road shock and wear due to rotative movement of the flywheel relative to its supporting and drive shaft.

It is another object of my present invention to provide deceleration control apparatus including a wheel slip detecting device characterized by a construction enabling wholly pneumatic control of fluid pressure operated brakes by the wheel-slip detecting device.

The above objects, and other objects of my invention which will be made apparent hereinafter, are attained by several embodiments of my invention subsequently to be described and shown in the accompanying drawings, wherein.

Figure 1:
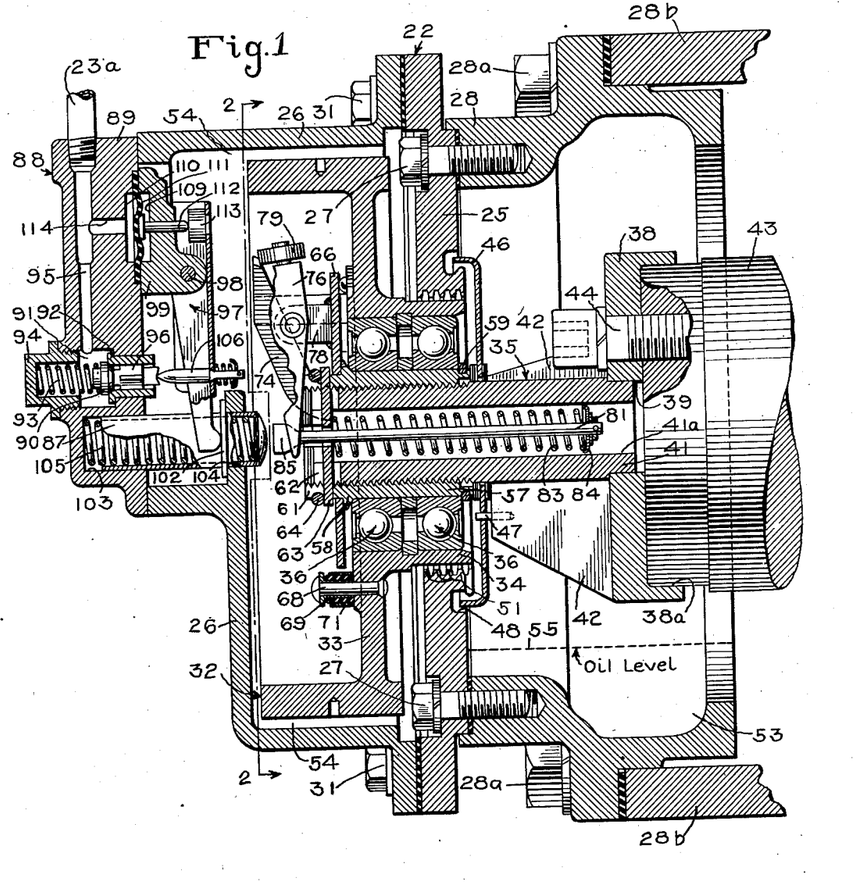
Fig. 1 is a vertical sectional view, showing one embodiment of the novel wheel-slip detecting device constituting my present invention.

Referring to Fig. 1 of the drawings the rotary inertia device 22 is mounted within a sectionalized casing comprising an annular end plate 25 and end cover 26. The end plate 25 is secured as by a plurality of screws 27 to the outer end of a removable adapter ring or casing 28 which is in turn, attached as by a plurality of bolts or screws 28a to the outer end of the standard axle journal casing 28b. The end cover 26 is substantially circular in form and is provided with four circumferentially spaced flanges 29 through which a plurality of screws or bolts 31 extend to secure the end cover to the end plate 25 which is of corresponding outer contour.

The rotary inertia device itself comprises an annular inertia ring or fly-wheel 32, the outer rim of which is joined through an intervening web 33 to a central hub 34. Hub 34 is rotatively mounted or journaled on a spindle 35, attached to the end of the axle in the manner more fully described presently, by means of two ball bearing races 36 disposed in axially spaced relation within the hub 34.

The spindle 35 is a fabricated member as shown, but it may be an integral casting if desired. As shown, the spindle 35 comprises a securing flange or disk 38 having a central bore or hole of circular or polygonal contour 39 in which one end of a tubular member 41 is received, and a plurality of angularly spaced supporting webs 42 suitably welded to the tubular member 41 and the disk 38 for maintaining the tubular member 41 in rigid perpendicular relation to the disk 38.

The disk 38 of the spindle 35 is provided with a suitable circular recess 38a on the outer face thereof in which the outer end of the axle 43 is received and is fixed to the axle by a plurality of screws 44 extending through suitable holes in the disk into registering tapped holes in the end of the axle. The spindle 35 thus rotates with the axle 43, the tubular member 41 of the spindle being in coaxial relation to the axle.

An annular oil-sealing disk 46 having a central hole therein is fitted over the tubular member 41 of the spindle 35 and secured, as by a pin 47 extending therethrough into one or more of the webs 42, for rotation with the spindle. The disk 46 is of shallow dish shape so that the outer rim thereof is cylindrical in form and parallel to the axis of rotation of the tubular member 41 of the spindle. The rim of the oil-sealing disk 46 extends partially into an annular cavity 48 formed in the face of the end plate 25.

The hub 34 of the fly-wheel 32 extends into a central circular opening in the end plate 25, slightly larger in diameter than the outer diameter of the hub 34. In this central opening in the end plate 25 are a plurality of axially spaced annular ribs 51. The ribs 51 function in cooperation with the sealing disk 46 and annular cavity 48 in the end plate 25 as an oil-seal to prevent the entrance of lubricating oil from the chamber 53, within the adapter ring 28 and axle journal casing 28b into the chamber 54 on the opposite side of the end plate 25 containing the fly-wheel 32. This type of oil-seal arrangement is not my invention.

It will be understood that the oil for lubricating the roller bearings supporting the axle 43 in its journal casing 28b extends normally to the level indicated by the broken line 55 within the adapter ring 28. It is necessary, therefore, to prevent the entrance of oil into the chamber 54 in order to prevent an accumulation of oil in chamber 54 to a level such that the lower portion of the flywheel 32 would run in oil, inasmuch as this would interfere with the proper operation of the wheel slip detecting device.

For ease of assembly and disassembly, the inner bearing ring of the bearing races 36 supporting the flywheel 32 on spindle 35 has an internally threaded sleeve 57 extending therethrough which screws on the outer threaded portion of the tubular member 41 of spindle 35 to a position clamping the oil-seal ring 46 against the end of the webs 42. Sleeve 57 has an annular shoulder 58 at one end and a snap ring 59 at the other end for holding the sleeve 57 in assembled relation with the bearing races 36.

The fly-wheel 32 is thus installed and removed from the spindle 35 by screwing the sleeve 57 on the threaded portion of the tubular member of the spindle 35 without disturbing or removing the end plate 25. Consequently it is not necessary to drain oil from the axle journal casing in order to remove the fly-wheel for inspection or repair.

The sleeve 57 has four slots 61 spaced around the end thereof which are adapted to register with correspondingly spaced slots 62 in the end of the tubular portion 41 of the spindle 35, the sleeve 57 being locked on the tubular portion 41 of the spindle 35 by means of a key 63, in the form of a Maltese cross, having four arms adapted to be received in the registering slots 61 and 62. (Fig. 2) A snap ring 64, cooperating with an annular groove on the outer surface of the sleeve 57, holds the key 63 in position.

Figure 2:
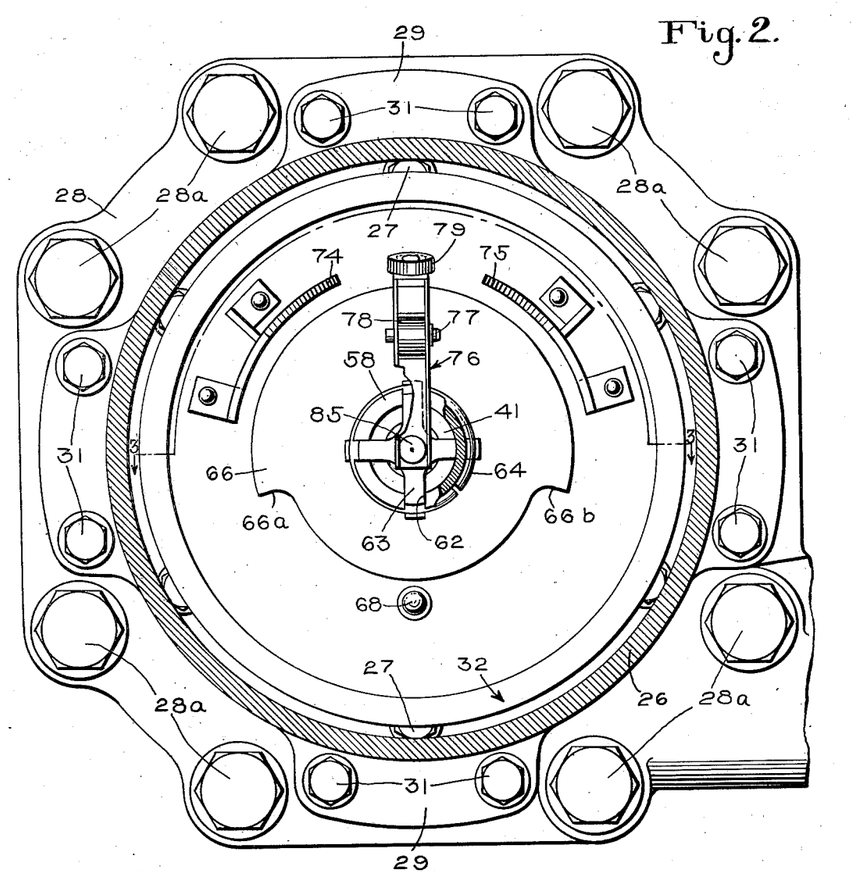
Fig. 2 is a sectional view, taken on the line 2—2 of Fig. 1, showing further details of the device.

A stop disk 66, the purpose of which will be explained presently, having a central hole is secured on the sleeve 57 outside the shoulder 58, as by welding. A portion of the periphery of stop disk 66 is cut away to a reduced radius, thereby providing two angularly spaced stop shoulders 66a and 66b (Fig. 2). Secured to the web 33 of the fly-wheel 32 between the shoulders 66a and 66b and in the plane thereof is a stop lug comprising a pin 68 riveted to the web and having a rubber bushing 69 thereon covered by a protecting sheet metal ring 71. The total degree of rotative movement of the fly-wheel 32 with respect to the spindle 35 is thus determined by the amount of rotative movement occurring between the engagement of the stop lug by the shoulder 66a and the engagement of the stop lug by the shoulder 66b.

Figure 3:
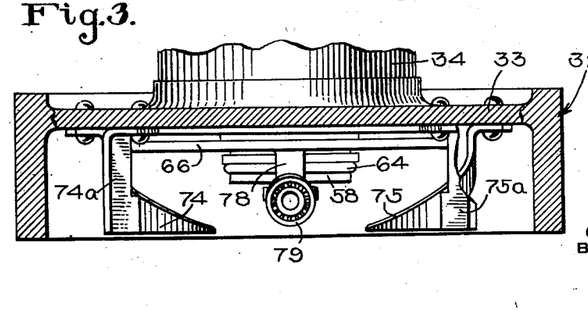
Fig. 3 is a sectional view, taken on the line 3—3 of Fig. 2, showing further details of the device.

Secured, as by riveting to the web 33 of the fly-wheel 32, are two circumferentially spaced arcuate cams 74 and 75, respectively. The free ends of the cams is rigidly supported against deflection by a bracket 74a or 75a welded thereto and attached as by rivets to the web of the fly-wheel 32. Cooperating with the cams 74 and 75 is an operating lever 76 of channel-shape which is disposed radially with respect to the axis of rotation of spindle 35 and is pivoted at a point between the ends thereof on a pin 77 carried in a lug 78 that is attached to the stop disk 66 as by welding. The outer end of the lever 76 has a roller 79 rotatively mounted thereon for engaging the inner cam surfaces on the cams 74 and 75, as shown particularly in Figs. 1 and 3, so as to cause the fly-wheel 32 to be rotated upon rotation of the spindle 35.

The peripheral or angular spacing between the cams 74 and 75 is such that the fly-wheel rotatively floats normally between the cams through a predetermined angle which is sufficient to cause revolution of the balls of the ball bearing races 36 through at least one complete revolution. This specific arrangement is a particular feature of my invention and its purpose is to uniformally distribute the wear on the balls of the ball bearing races and insure adequate lubrication of the balls to minimize wear on the balls.

The inner end of the pivoted lever 76 terminates adjacent the outer end of the tubular member 41 of spindle 35 substantially at the axis of rotation of spindle 35 and has a hole therein through which a rod 81 extends into the central bore 41a of the tubular member 41. A coil spring 83 contained in the bore 41a in concentric relation to the rod 81 is interposed between the key 63 and a collar 84, fixed on the end of the rod 81, to urge the rod normally in an axial direction toward the axle 43.

The rod 81 has an enlarged portion or head 85 at the end thereof which engages the inner end of the pivoted lever 76 and the length of the rod 81 is such that the pivoted lever 76 is normally pivotally biased to the position determined by the engagement of the lever with the end of the tubular portion 41 of spindle 35, in which the roller 79 is in the alignment with the base of the inclined cam surfaces on the cams 74 and 75, as shown in Fig. 1.

When the fly-wheel 32 shifts rotatively in one direction with respect to the spindle 35 due to deceleration or acceleration of the axle 43, the roller 79 on the lever 76 engages the corresponding one of the cam surfaces on the cams 74 and 75, and depending upon the rate of deceleration or acceleration of the axle 43, is correspondingly pivoted in a right-hand direction as seen in Fig. 1 in opposition to the force of spring 83, which is correspondingly compressed.

The spring 83 is so designed that unless the axle 43 rotatively decelerates at a rate exceeding a certain rate, corresponding to a rate of retardation of the car of ten miles per hour per second, the plunger or rod 81 is not shifted appreciably in the left-hand direction by the pivotal movement of the lever 76. In view of the fact, previously explained, that a car wheel does not attain a rate of deceleration, corresponding to a rate of retardation of the car of ten miles per hour per second, unless the wheel is actually slipping, it will be seen that the rod 81 is not shifted appreciably in the left-hand direction out of the position shown unless the wheels fixed on the axle 43 are actually slipping.

If the axle 43 rotatively decelerates at a rate exceeding that corresponding to a retardation of the car of ten miles per hour per second, the rod 81 is shifted sufficiently in the left-hand direction out of the normal position shown to engage the operating plunger 87 of a pilot valve device 88 embodied in a casing section 89 attached to the outer face of the casing section 26, which pilot valve device will now be described.

Essentially, the pilot valve device 88 comprises a poppet valve 90 contained in a chamber 91 and urged into seated relation on a seat bushing 92 by a coil spring 93 interposed between the valve and a screw plug 94 closing the opening of the chamber 91 to the exterior of the casing.

A passage 95 is open at one end to the chamber 91 and at the opposite end to the exterior of the casing 89. A pipe 23a is connected to the outer end of the passage 95, as by a screw connection, and provides a fluid pressure communication between the device 22 and any other device (not shown) adapted to be controlled by the device 22.

The valve 90 has a fluted stem 96 that is guided in the seat bushing 92 and projects into the chamber 54 of the casing section 26.

The valve 90 is unseated by movement of the operating plunger 87 through an intervening lever 97. The lever 97 is of channel shape and is pivotally mounted between the ends thereof on a pin 98 supported in a bracket member 99 that is attached to the inner face of the casing section 89, as by screws not shown.

A portion of the web of the lever 97 is cut away and the side flanges spread apart to form a yoke that straddles the plunger 87 which is tubular in form. The ends of the yoke arms or side flanges of the lever 97 are suitably rounded to form substantially a point contact with the side surface of a radially extending collar 102 formed on or attached to the external surface of the plunger 87.

The plunger 87 is slidably supported at one end in a bore 103 in the casing section 89 and at the opposite end in a hole 104 in a portion of the wall of the casing section 26, the longitudinal axis of the plunger coinciding with the axis of rotation of axle 43 and the axis of rod 81. The inner end of the plunger 87 projects into the chamber 54 and is closed to provide a rounded contact head. A coil spring 105 contained within the tubular plunger 87 and interposed between the closed end thereof and the casing section 89 normally yieldingly biases the plunger in the right-hand direction to a position determined by the engagement of the collar 102 with the casing section 26. In this position the inner rounded contact end of the plunger 87 has a slight clearance with respect to the head 85 on the operating rod 81.

A toggle pin 106, secured to the web of the lever 97, has a pointed end engaged in a conical recess on the inner end of the fluted stem of the valve 90 and is thus effective to transmit the force exerted by the lever 97 to the valve 90 to effect unseating thereof. The toggle pin adjusts itself automatically to the angular position of the lever 97 so that the force exerted by the lever to unseat the valve 90 is always in a straight line coincident with the axis of the fluted stem of the valve. Consequently, there is no tendency at any time to cause cocking of the valve 90 on its seat and unintended and undesired leakage of fluid under pressure past the valve 90 from the passage 95 is thus prevented.

In order to balance the force of the fluid pressure in the passage 95 urging the valve 90 to its seated position and resisting the unseating thereof, a movable abutment shown as a flexible diaphragm 111 is provided for exerting a counterbalancing or balancing effect. This abutment may take the form of a piston, if desired. The diaphragm shown is of suitable flexible rubber and is clamped around the periphery thereof between the bracket member 99 and the casing section 89. Two cavities or chambers 109 and 110, preferably circular in cross-section, are provided in the bracket member 99 and the casing section 89 on opposite sides of the diaphragm 111, the chamber 110 communicating with the passage 95 through a branch passage 114 so that the diaphragm is subject on one face thereof to the pressure of the fluid in the passage 95 moving it in a right-hand direction.

A follower pin 112 is loosely guided in the bracket 99 in perpendicular relation to the center of the diaphragm, a suitable head on the pin engaging the face of the diaphragm within the chamber 109. Chamber 109 is thus connected to atmosphere and the corresponding face of diaphragm 111 open to chamber 109 is thus always subject to atmospheric pressure. The end of the follower pin 112 is suitably rounded for engaging a contact lug 113 attached, as by welding, to the web of the lever 97 at a point on the opposite side of the fulcrum pin 98 relative to the toggle pin 106.

It will accordingly be seen that the force exerted on the lever 97 by the fluid pressure acting on the diaphragm 111 urges the lever in a clockwise direction and in opposition to the force of spring 93 and of the fluid pressure in chamber 91 holding the valve 90 seated. The arrangement is such that the effective force exerted by the diaphragm to unseat valve 90 is slightly less than the fluid pressure force and the force of the spring 93 holding the valve 90 seated.

By reason of the arrangement above described, it will be apparent that a relatively light force is required to rock the pivoted lever 97 in a clockwise direction to effect unseating of the valve 90. This is desirable because of the magnitude of the forces available to shift the operating rod 81 in a left-hand direction. Moreover, it is intended that the position of the operating rod 81 accurately reflect the rate of change of rotational speed of the axle 43. It is desirable, therefore, to avoid adding a substantial resisting force to the displacement of the operating rod 81 in the left-hand direction for the reason that such resisting force would prevent the rod 81 assuming a position corresponding to the rate of change of speed of the axle 43.

It is furthermore desirable that the valve 90 be unseated promptly in response to a rate of rotative deceleration of the axle 43 reflecting a wheel-slip condition. Consequently, it is desirable that the force required to unseat the valve 90 be relatively small so as not to delay the unseating of the valve 90 in response to a wheel-slip condition.

The chamber 54 in the casing section 26 is at atmospheric pressure by reason of the connection to atmosphere through the axle journal casing 28b. It follows therefore that when the valve 90 is unseated, it vents fluid under pressure from passage 95 and pipe 23a to atmosphere at a rapid rate.

*Operation*

It will be understood that the valve 90 may be employed to pilot any fluid pressure operated control mechanism through a pneumatic connection, such as the pipe 23a. For the purpose of controlling the brakes of a railway car or train the valve 90 may be employed to pilot a so-called vent valve mechanism of the type described and shown in my copending divisional application, now Patent 2,366,044. The subsequent description of the operation and use of the inertia device 22 should be readily understandable, therefore, without further description herein, by reference to the aforesaid Patent 2,366,044.

Let it be assumed that when the brakes are applied in the usual manner to the wheels fixed to the axle 43, a slipping condition is induced. In such case, the axle 43 is rotatively decelerated at an abnormally rapid rate exceeding ten miles per hour per second. As a result, the fly-wheel 32 over-runs the spindle 35, and the roller 79 on the lever 76 rides up the inclined surface on the cam 74 or 75, depending upon the direction of rotation of axle 43, thereby causing the lever 76 to be rocked so as to shift the rod 81 outwardly to effect unseating of the valve 90 of the pilot valve device 88.

Such unseating of the valve 90 causes a rapid reduction of the control pressure for the event valve mechanism controlling the supply of fluid under pressure to the brake cylinder, and the vent valve mechanism is correspondingly operated to cut off the supply of fluid under pressure to the brake cylinder and vent fluid under pressure at a rapid rate from the brake cylinder.

Due to the instantaneous and rapid reduction of the pressure in the brake cylinder, the wheels of the slipping wheel unit promptly cease to decelerate and begin to accelerate back toward a speed corresponding to car speed before the speed of the slipping wheels is reduced to zero and thus before the wheels can become locked and slide.

The rotative acceleration of the axle 43 of the slipping wheel unit at this time is abnormally high in rate, corresponding in order of magnitude to the high rate of deceleration during the wheel slip condition. The fly-wheel 32 accordingly shifts rotatively from a leading to a lagging position with respect to the spindle 35 and axle 43. The roller 79 on the lever 76 thus runs down the inclined cam surface on the cam 74 (or 75) which it engaged during deceleration of the wheel unit and engages and climbs the inclined surface on the other cam 75 (or 74), thus again shifting the rod 81 outwardly in the left-hand direction, as seen in Fig. 1, to again effect unseating of the valve 90 of the pilot valve device 88.

During the interval that the roller 79 on the lever 76 disengages one of the cams 74 or 75 and engages the other, the lever 76 is restored to its normal position by the spring 83 through the medium of the rod 81. With the force of the rod 81 on the plunger 87 thus momentarily removed, the spring 195 restores the plunger 87 momentarily to its normal position, thus permitting the valve 90 to be promptly reseated because of the substantially balanced fluid pressure forces acting on the valve 90 and the diaphragm 111 as applied to the lever 97.

Such momentary closure of the valve 90 is without consequence, however, for the reasons that the cycle of operation of the vent valve mechanism started by the device 22 continues automatically, once it is initiated in response to the initial rapid reduction of pressure caused by unseating of the valve 90. When the brake cylinder pressure is reduced to a certain low value, the vent valve mechanism is automatically restored to its normal condition in which it cuts off the exhaust of fluid under pressure from the brake cylinder and reestablishes the communication through which fluid under pressure is supplied to the brake cylinder to reapply the brakes on the wheels fixed on axle 43.

When the wheels of the slipping wheel unit have accelerated fully back to a speed corresponding to car speed, the wheels are again decelerated in accordance with the rate of retardation of the car at the normal low rate, such as four miles per hour per second, depending upon the degree of the brake application. In such case, therefore, the fly-wheel 32 again shifts rotatively from a lagging position to a leading position with respect to the axle 43. The lever 76 is thus again restored to its normal position during the interval in which the roller 79 on the lever disengages one of the cams 74 or 75 and engages the other. The valve 90 is thus correspondingly reseated to cut off further venting of fluid under pressure from the passage 95. Moreover, as long as the wheels of a previously slipping wheel unit do not again decelerate at more than the normal rate, the angular displacement of the lever 76 due to cooperation with one or the other of the cams 74 or 75 is insufficient to cause the rod 81 to be removed outwardly enough to effect displacement of the plunger 87 of the pilot valve device in the left-hand direction out of its normal position. Consequently, the valve 90 of the pilot valve 88 remains seated thereafter until such time as the wheels associated with the axle 43 again begin to slip.

The construction of the wheel-slip detecting devices 22 in such a manner that the fly-wheel 32 is free to shift, unresistedly, relative to the spindle 35 and axle 43 through a predetermined angle determined by the angle through which the roller 79 on the lever 76 moves in shifting from one of the cams, such as cam 74, to the other of the cams is one of the novel features of my present invention. The fact that the fly-wheel 32 is free to float or shift rotatively at all times in unresisted manner through the predetermined angle relative to the axle in the manner just pointed out, causes the individual balls of the ball bearing races 36 to be rotated through at least one complete revolution repeatedly upon slight changes in the rotational speed of the axle 43. As a result, the lubricating grease in the ball bearing races is constantly active between the contacting surface of the balls and the annular ball retaining elements. Wear on the balls is thus minimized. At the same time, due to the revolution of the balls through at least one complete revolution, the wear on the balls of the ball bearing races is evenly distributed so as to prevent the balls from attaining an elliptical or egg-shaped form. Obviously, if the true spherical form of the balls is departed from, the friction in the ball bearing races is increased and the sensitivity and the accuracy of the wheel-slip detecting device as a whole is seriously impaired.

In heretofore known wheel-slip detecting devices of the rotary inertia type, the fly-wheel is yieldingly maintained in a certain normal rotative position relative to the driving spindle or shaft thereof by constantly active resilient means and is shifted yieldingly out of such position to a degree corresponding to the rate of change of speed of the driving spindle. In such case, the total degree of rotative movement of the fly-wheel relative to the driving spindle is so limited that the fly-wheel bearing elements, whether of the ball or roller type, cannot rotate through at least one complete revolution. Consequently, after a period of time, the balls or rollers are worn unevenly and attain an elliptical or egg-shaped form, thus interfering with the sensitivity and the accuracy of the device.

The arrangement which I have provided serves to prevent the uneven wear on ball elements of the ball bearing races and on roller elements of roller bearing races if such bearing races are employed and thus obviates the need for repair or replacement of the bearing units.

When the car or train comes to a stop in response to the brake application, the inertia device 22 remains inoperative due to lack of rotation of axle 43. The brakes thus remain applied and may be released by the operator in the usual manner prior to again starting the car or train.

*Figures 4, 5, 6 and 7*

A different form of wheel-slip detector 22A is shown in Figs. 4, 5, 6 and 7. The wheel-slip detector 22A is similar in many respects to the wheel-slip detector 22 and corresponding parts will, therefore, be designated by the same reference numerals without further description. It is deemed sufficient, therefore, merely to point out the differences in the construction of the wheel-slip detector 22A with respect to the wheel-slip detector 22.

Figures 4, 5, 6:
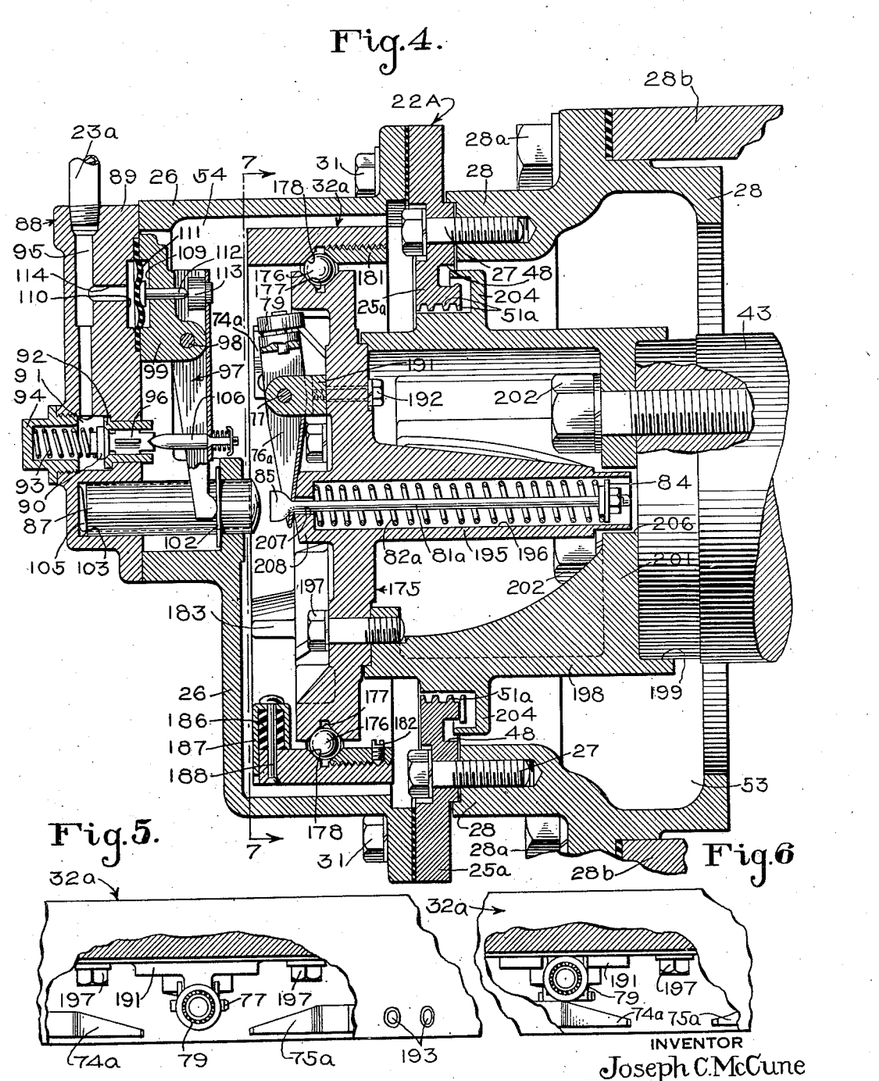
Fig. 4 is a vertical sectional view of another embodiment of a wheel-slip detecting device embodying my invention.
Figs. 5 and 6 are fragmental views showing the cam mechanism constituting a part of the device shown in Fig. 4 for different positions of the inertia ring or fly-wheel respectively, Fig. 5 being in part a section taken on the line 5—5 of Fig. 7.
Figure 7:
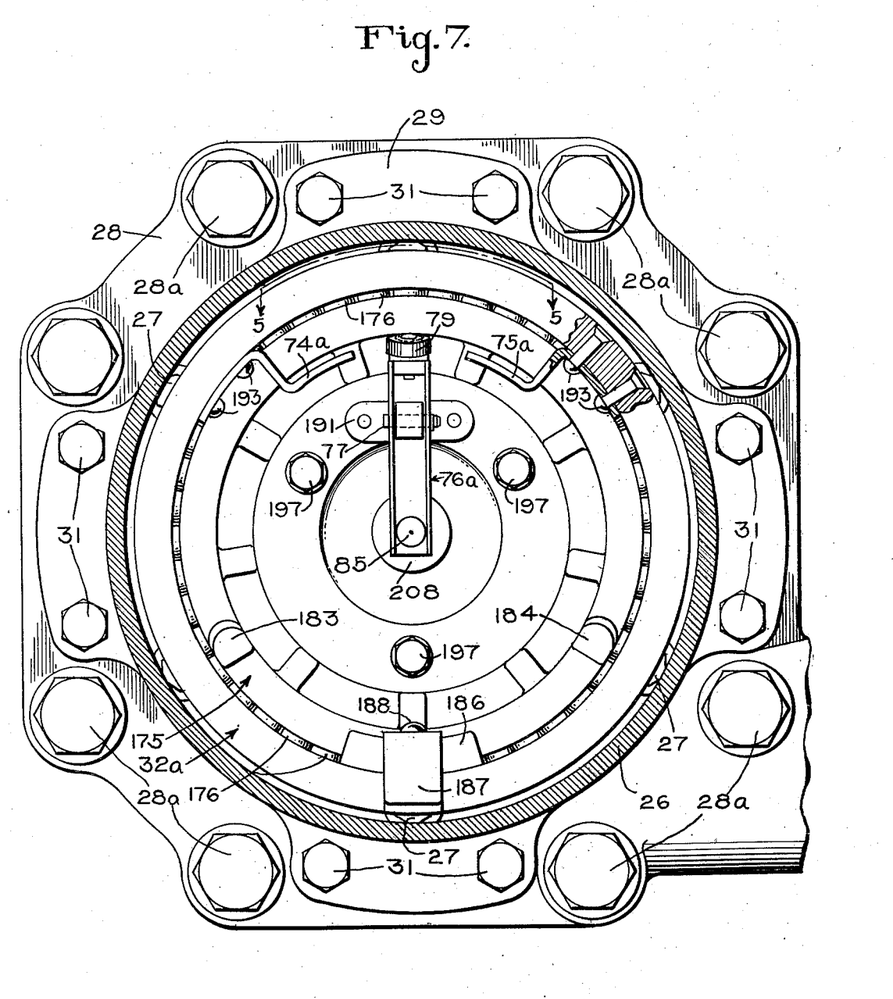
Fig. 7 is a sectional view, taken substantially on the line 7—7 of Fig. 4.

Essentially, the wheel-slip detector 22A differs from the wheel-slip detector 22 in the manner of mounting the fly-wheel for rotative movement with respect to the axle 43. Referring to Fig. 4, the fly-wheel 32a is in the form of a ring and is mounted directly on a disk-shaped hub member 175 of relatively large diameter by means of a continuous series of ball bearings 176 confined in a tubular annular groove formed by cooperating V-shaped grooves 177 and 178 in the outer surface of the hub member 175 and the internal surface of the fly-wheel or ring 32a, respectively.

In order to permit assembly of the balls 176 between the fly-wheel 32a and the hub member 175 in the grooves 177 and 178, one end of the fly-wheel 32a is of enlarged internal diameter and is threaded to receive an exteriorly threaded ring 181. When the ring 181 is screwed into the end of the ring 32a, it provides one of the side surfaces of the annular groove 178. A set screw 182 is provided for locking the ring 181 in place after it is properly adjusted so as to permit free movement of the balls 176 without unnecessary looseness or play.

The degree of rotative movement of the fly-wheel 32a with respect to the hub 175 is limited by two angularly spaced lugs 183 and 184 formed on or attached to the hub member 175 and arranged to engage opposite ends respectively of a rubber stop 186 that is secured to the fly-wheel 32a by a bracket 187 and a rivet 188.

A lever 76a, corresponding to the lever 76 of the wheel-slip detecting device 22 is pivotally mounted on a pin 77 carried by a bracket 191 attached, as by a plurality of screws 192, to the hub member 175. The lever 76a has a roller 79 rotatably mounted thereon which cooperates with a pair of cams 74a and 75a, secured as by rivets 193 to the inner surface of the fly-wheel 32a.

For the same reason as in the previously described wheel-slip detector 22, the cams 74a and 75a of device 22A are so peripherally or angularly spaced that the angle through which the fly-wheel 32a floats rotatively relative to the axle 43 when the roller 79 on lever 76a shifts from one cam 74a or 75a to the other is such as to insure revolution of the balls 176 through at least one complete revolution.

The hub member 175 is secured adjacent the outer periphery thereof by a plurality of screws 197 to a cylindrical member 198, the member 198 having a recess 199 in the end wall 201 thereof, in which the outer end of the axle 43 is received. The cylindrical member 198 is secured to the axle 43 by a plurality of screws 202 which extend through corresponding holes in the end wall 201 into tapped holes in the end of the axle. The recessed portion of the end wall 201 supports the cylindrical member 198 in rigid coaxial alignment with the axle 43 and prevents the imposition of excessive shearing stresses on the screws 202 due to shocks and jars incidental to travel of the car on the train rails.

The cylindrical member 198 is provided with a radially extending oil-sealing flange 204 that terminates at the periphery thereof in a cylindrical portion. The cylindrical portion of the flange 204 extends axially into an annular cavity 48 in the face of end plate 25a. The end plate 25a is secured as by a plurality of bolts or screws 27 to the outer end of adapter ring 28. The end plate 25a has a series of axially spaced annular ribs 51a surrounding the central opening therein and the cylindrical member 198 is provided with a portion of increased diameter for fitting closely within the central opening of end plate 25a with slight clearance with respect to the annular ribs 51a. The arrangement of the annular ribs 51a with respect to the cylindrical member 198 and of the oil-sealing flange 204 with respect to cavity 48 of end plate 25a is such as to prevent the entrance of oil from the adapter ring 28 into the chamber 54 formed in the casing section 26. This oil-sealing arrangement is analogous to the arrangement provided in the wheel-slip detector 22 and is not per se my invention.

The hub member 175 has a central tubular portion 195 which is supported at the outer end thereof in a central opening 206 in the end wall 201 of the cylindrical member 198. An operating rod 81a, corresponding to the operating rod 81 of the wheel-slip detector 22, extends through an opening in the lower end of the lever 76a and through a small hole 207 in a central boss 208 on the hub member 175 into the bore 196 of the tubular portion 195. Interposed between a guide collar or washer 84 fixed on the inner end of the rod 81a and the base of the bore 195 is a coil spring 82a for urging the rod 81a in the right-hand direction as seen in Fig. 6. A head 85 on the end of the rod 81 cooperates with the lever 76a in a manner such that the spring 82a is effective to urge the lever in a counterclockwise direction into normal engagement with boss 208 of the hub member 175.

The operation of the wheel-slip detecting device 22A is the same as that described for the wheel-slip detecting device 22 and it is deemed unnecessary, therefore, to repeat a description of such operation, except to point out that the lever 76a is rocked in a clockwise direction and rod 81a shifted in the left-hand direction in opposition to the restraining force of the spring 82a when the rate of deceleration or acceleration of the wheel axle 43 is such as to cause sufficient rotative movement of the fly-wheel 32a with respect to the hub member 175.

The wheel-slip detector 22A is provided with a pilot valve device 88 identical to that described previously for wheel-slip detector 22 which device includes an operating plunger 87 disposed in coaxial alignment with the operating rod 81a and engaged by the operating rod 81a in its movement in the left-hand direction.

Having now described my invention, what I claim as new and desire to secure by Letters Patent is:

1. A rotary inertia device comprising a rotary element, a fly-wheel rotatably mounted on the rotary element, cooperating means partly on said rotary element and partly on said fly-wheel for unresistingly permitting the rotative movement of the fly-wheel with respect to the rotary element through a predetermined angle and for yieldingly resisting additional rotative movement of the fly-wheel relative to the rotary element beyond the extremity of unresisted rotative movement of the fly-wheel, in either direction, with respect to the rotary element, and means operatively response only to that portion of the rotative movement of the fly-wheel relative to the rotary element which is yieldingly resisted.

2. A rotary inertia device comprising a rotary element, a flywheel rotatively mounted on the rotary element, and cooperating means partly on the fly-wheel and partly on the rotary element so constructed and arranged that the fly-wheel rotatively floats unresisted through a predetermined angle with respect to the rotary element and thereafter shifts rotatively, for either direction of rotation thereof, with respect to the rotary element in accordance with the rate of change of rotational speed of the rotary element, and means actuated solely in accordance with that portion of the rotational movement of the fly-wheel with respect to the rotary element which is in accordance with the rate of change of speed of the rotary element.

3. A rotary inertia device comprising a rotary element, a fly-wheel rotatively mounted on the rotary element, a pair of cams carried by the fly-wheel in peripherally spaced relation, a movable member carried by the rotary element at a point between said cams and engageable with said cams alternatively, depending upon the direction of rotative movement of the fly-wheel with respect to the rotary element in a manner to be moved by cooperation therewith, resilient means carried by the rotary element for yieldingly resisting movement of said movable member and consequently rotative movement of said fly-wheel relative to said rotary element only at the extremities of a predetermined angle of unresisted rotative movement of the fly-wheel relative to the rotary element determined by the peripheral spacing of said cams, and means operatively responsive to movement of said movable member.

4. A rotary inertia device comprising a rotary element, a fly-wheel, a plurality of rotary bearing elements interposed between the fly-wheel and the rotary element for rotatively mounting the fly-wheel on the rotary element in coaxial relation thereto, cooperating means partly on said fly-wheel and partly on said rotary element effective to unresistingly permit rotative movement of the fly-wheel rotatively with respect to the rotary element through a predetermined angle and effective to yieldingly resist additional movement of the fly-wheel rotatively with respect to the rotary element in accordance with the rate of change of rotational speed of the rotary element, said predetermined angle of rotative movement of the fly-wheel with respect to the rotary element being such with relation to the size of said rotary bearing elements as to insure at least one complete revolution of the individual bearing elements in response to the rotative movement of the fly-wheel with respect to the rotary element through said predetermingled angle, and means operatively responsive to the rotary movement of the fly-wheel with respect to the rotary element for only such portion of relative movement as is in accordance with the rate of change of speed of the rotary element.

5. A rotary inertia device comprising a rotary element, a fly-wheel, a plurality of rotary bearing elements for mounting said fly-wheel rotatively on and in coaxial relation to the rotary element, a lever pivoted on said rotary element and disposed radially with respect to the axis of rotation thereof, resilient means carried by the rotary element and arranged to yieldingly bias said lever in one direction to a certain position, a pair of cams carried by said fly-wheel in peripherally spaced relation and on opposite sides of said lever respectively, said cams cooperating alternatively with said lever, depending upon the direction of rotation of the fly-wheel relative to the rotary element, in a manner to cause pivotal movement of the lever in a direction opposite to said one direction in opposition to the force of said resilient means to a degree corresponding substantially to the rate of change of speed of the rotary element, the angular spacing between said cams being such that the amount of unresisted rotative movement of the fly-wheel with respect to the rotary element is such as to insure at least one complete revolution of said bearing elements, and means operatively responsive to the pivotal movement of said lever.

6. A rotary inertia device comprising a rotary element, a fly-wheel rotatively mounted on the rotary element, a radially disposed lever pivotally mounted on the rotary element, resilient means yieldingly biasing said lever in one direction to a certain position, a pair of cams carried by the fly-wheel in peripherally spaced relation and on opposite sides of said lever respectively, said cams being so constructed and arranged as to cooperate alternatively with said lever in a manner to cause pivotaly movement thereof in a direction opposite to said one direction and in opposition to the force of said resilient means according to the rate of change of speed of the said rotary element, and means operatively responsive to the pivotal movement of said lever.

7. A rotary inertia device comprising a rotary element, a fly-wheel rotatively mounted on said rotary element in coaxial relation therewith, a radially disposed lever pivotally carried on the rotary element, an operating rod carried by the rotary element in coaxial relation thereto and cooperating with said lever, resilient means carried by the rotary element and yieldingly urging said operating rod and correspondingly said lever to a certain position, a pair of cams carried on said fly-wheel in peripherally spaced relation and on opposite sides of said lever respectively, said cams being so constructed and arranged as to cooperate alternatively with said lever upon rotative movement of the fly-wheel in either direction with respect to said rotary element and effective to pivotally move said lever in a direction opposite to said one direction in opposition to said resilient means in accordance with the rate of change of speed of the rotary element, and means operatively responsive to pivotal movement of said lever.

8. A rotary inertia device comprising a rotary element, a fly-wheel rotatively mounted on said rotary element in coaxial relation therewith, a radially disposed lever pivotally carried on the rotary element, an operating rod carried by the rotary element in coaxial relation thereto and cooperating with said lever, resilient means carried by the rotary element and yieldingly urging said operating rod and correspondingly said lever in one direction to a certain position, a pair of cams carried on said fly-wheel in peripherally spaced relation and on opposite sides of said lever respectively, said cams being so constructed and arranged as to cooperate alternatively with said lever upon rotative movement of the fly-wheel in either direction with respect to said rotary element and effective to pivotally move said lever in a direction opposite to said one direction in opposition to said resilient means in accordance with the rate of change of speed of the rotary element, and a non-rotative control member in coaxial alignment with said operating rod and adapted to be engaged by said operating rod and slidably moved in accordance with the displacement of the operating rod out of the certain position thereof in the direction opposite to said one direction.

JOSEPH C. McCUNE.

REFERENCES CITED

The following references are of record in the file of this patent:

UNITED STATES PATENTS

| Number | Name | Date |
| --- | --- | --- |
| 821,286 | Grant | May 22, 1906 |
| 2,038,162 | Cadman | Apr. 21, 1936 |
| 2,068,370 | Bush | Jan. 19, 1937 |
| 2,140,620 | Farmer | Dec. 20, 1938 |
| 2,145,567 | Cotter | Jan. 31, 1939 |
| 2,198,030 | Farmer | Apr. 23, 1940 |
| 2,198,032 | Farmer | Apr. 23, 1940 |
| 2,198,033 | Farmer | Apr. 23, 1940 |
| 2,198,034 | Farmer | Apr. 23, 1940 |
| 2,225,716 | Sexton | Dec. 24, 1940 |
| 2,248,850 | Campbell | July 8, 1941 |
| 2,263,512 | Logan | Nov. 18, 1941 |
| 2,272,601 | Eksergian | Feb. 10, 1942 |
| 2,290,588 | Grondahl | July 21, 1942 |
| 2,294,606 | Newell | Sept. 1, 1942 |
| 2,322,003 | Farmer | June 15, 1943 |